United States Patent
Florence

(10) Patent No.: US 6,712,472 B2
(45) Date of Patent: Mar. 30, 2004

(54) COLOR FIELD SEQUENTIAL PROJECTOR INCLUDING POLARIZED LIGHT BEAM SPLITTER AND ELECTRONICALLY CONTROLLABLE BIREFRINGENCE QUARTER WAVEPLATE

(75) Inventor: James M. Florence, Dallas, TX (US)

(73) Assignee: Sharp Laboratories of America, Inc., Camas, WA (US)

( * ) Notice: Subject to any disclaimer, the term of this patent is extended or adjusted under 35 U.S.C. 154(b) by 144 days.

(21) Appl. No.: 10/075,469

(22) Filed: Feb. 13, 2002

(65) Prior Publication Data

US 2003/0151723 A1 Aug. 14, 2003

(51) Int. Cl.[7] .......................... G03B 21/14; G03B 21/00
(52) U.S. Cl. ............................ 353/20; 353/31; 353/84; 353/122
(58) Field of Search .......................... 353/20, 33, 30, 353/122, 31, 84; 349/5, 6, 7, 8, 9

(56) References Cited

U.S. PATENT DOCUMENTS

| | | | |
|---|---|---|---|
| 5,327,270 A | 7/1994 | Miyatake | |
| 5,576,854 A | 11/1996 | Schmidt et al. | |
| 5,863,125 A | * 1/1999 | Doany | 353/84 |
| 6,390,626 B2 | * 5/2002 | Knox | 353/20 |
| 6,547,396 B1 | * 4/2003 | Svardal et al. | 353/8 |
| 2002/0140904 A1 | * 10/2002 | Brennesholtz | 353/21 |
| 2003/0117357 A1 | * 6/2003 | Florence | 345/88 |

* cited by examiner

Primary Examiner—Russell Adams
Assistant Examiner—Andrew Sever
(74) Attorney, Agent, or Firm—David C. Ripma; Matthew D. Rabdau

(57) ABSTRACT

A color field sequential projector includes an electronically controllable quarter waveplate positioned between a reflection device and a polarized light beam splitter, wherein the controllable quarter waveplate is switched to be optimum for particular wavebands as the illumination distribution changes during a color field sequence. The electronically controllable quarter waveplate provides for improved contrast performance and color purity in the projected image.

20 Claims, 1 Drawing Sheet

COLOR FIELD SEQUENTIAL PROJECTOR INCLUDING POLARIZED LIGHT BEAM SPLITTER AND ELECTRONICALLY CONTROLLABLE BIREFRINGENCE QUARTER WAVEPLATE

FIELD OF THE INVENTION

This invention relates to a color field sequential projection system including a polarized light beam splitter and an electronically controllable birefringence quarter waveplate and, more particularly, to an electronically controllable birefringence quarter waveplate which allows for improved contrast performance and color purity in a color field sequential projector using a polarized light beam splitter.

BACKGROUND OF THE INVENTION

Conventional projection systems comprise a reflective liquid crystal display (LCD) device and a polarized light beam splitter (PBS) prism to produce a projected image. A quarter waveplate may be introduced between the PBS prism and the LCD panel to compensate for depolarization in the skew rays of light passing through the prism. This compensation is believed to be necessary to achieve the best dark state of the projected image and, therefore, the best contrast ratio. The quarter waveplate is usually optimized for the waveband illuminating the LCD panel. Accordingly, in a three panel system a red optimized quarter waveplate is placed in front of the red LCD device, a green optimized quarter waveplate is placed in front of the green LCD device, and a blue optimized quarter waveplate is placed in front of the blue LCD device. In other words, the three different quarter waveplates are each optimized for a particular and unique waveband.

In a color field sequential projector using a single LCD panel, however, the single panel is exposed to multiple wavebands of light as the display sequences through the display of the red, green and blue images that make up the full color projection. For optimum dark level, an optimized quarter waveplate would have to be physically switched in front of the LCD as the illumination waveband changes. Due to applicable time constraints, this application has not been pursued. Accordingly, prior art projection systems utilizing only a single LCD panel do not use a quarter waveplate positioned between the PBS prism and the LCD panel. There appears to be no prior art solution to improve contrast performance and color purity in a color field sequential projector using a polarized light beam splitter.

SUMMARY OF THE INVENTION

The assembly of the present invention provides an electronically controllable quarter waveplate positioned between an LCD panel and the polarized light beam splitter, wherein the controllable quarter waveplate can be switched to be optimum for each waveband as the illumination distribution changes in the color field sequence. In other embodiments, multiple controllable quarter waveplates may be used in a single projector system.

Accordingly, an object of the invention is to provide a color field sequential projector including an electronically controllable quarter waveplate.

Another object of the invention is to provide a color field sequential projector including an electronically controllable quarter waveplate, a PBS prism and at least one LCD panel.

A further object of the invention is to provide a color field sequential projector including a quarter waveplate that can be switched to be optimum for each waveband as the illumination distribution changes in the color field sequence.

DETAILED DESCRIPTION OF THE PREFERRED EMBODIMENTS

Figure 1:
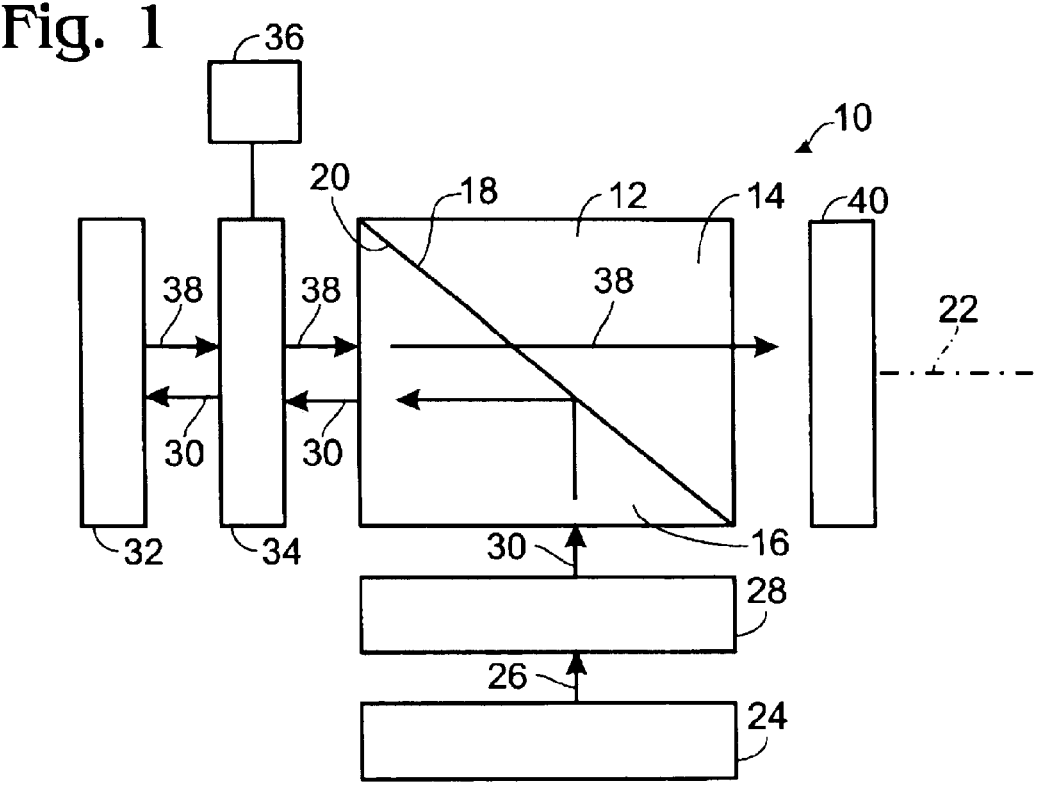
FIG. 1 is a schematic of the color field sequential projector including an electronically controllable quarter waveplate.

Turning now to the drawings, FIG. 1 shows a color field sequential projector 10 including an electronically controllable quarter waveplate. In particular, projector system 10 includes a polarized light beam splitter prism 12 including first and second halves 14 and 16, respectively. Prism 12 typically comprises a glass cube but other shapes and materials may be utilized as is known in the art. In the preferred embodiment, halves 14 and 16 of prism 12 typically each comprise a triangular shaped section, each section having an internal surface 18 and 20, respectively, wherein surfaces 18 and 20 are positioned at a forty five degree angle to an axis 22 of light emission from the prism.

Projector system 10 further comprises a light source 24 that provides, for example, S-polarized white light 26. The light source may provide, however, any type or orientation of light as is desirable for a particular application. The S-polarized light 26 passes through a color switching device 28, which may comprise, for example, an electronic color switch from ColorLink (Registered Trademark) or a color wheel. Color switching device 28 typically passes a particular colorband, or waveband, of light 30 at any given time, and typically passes a repeating sequence of a red colorband, a green colorband and a blue colorband. The S-oriented light 30 then enters prism 12 and reflects to a liquid crystal display (LCD) device 32. Of course, other reflection devices as known in the art may also be utilized.

An electronically controllable quarter waveplate 34 is positioned between prism 12 and reflection device 32. Quarter waveplate 34 operates in the electronically controlled birefringence mode. In this mode, a different amount of birefringent delay can be set on the cell by changing the applied voltage via a controller 36 operatively connected to waveplate 34. Thus, cell 34 can be set to be an optimum red quarter waveplate during red waveband illumination, an optimum green quarter waveplate during green waveband illumination, and an optimum blue quarter waveplate during blue waveband illumination.

In a reflective liquid crystal projector, light is directed through a polarizing beam splitter, such as beam splitter 12, and onto the reflective LCD. This is typically S-polarized light, reflected off the beam splitter prism face and down to the reflective LCD. To produce a bright image spot on the screen, the LCD modulates light reflected back to the prism to the P-polarized state, which passes through the prism and on to the projection lens. The illumination distribution entering the prism is not collimated light. Rather, it is a converging distribution of light that has a spread of angles controlled by the f-number of the illumination and projection optics. These f-numbers are usually matched and it is desirable to have the f-number small in order to produce a brighter image on the projection screen. A lower f-number means that light rays at larger angles are converging toward the LCD through the prism.

An S-polarized light ray traveling parallel to the optical axis will reflect off the prism face and be incident at the LCD as an S-polarized ray. However, the polarization of the higher angle rays, or skew rays, is slightly changed on reflection from the planar prism face. These rays will therefore have a small P-polarized component when they are incident on the LCD.

For the LCD to display black on the screen, it is set to not change the polarization of the reflected light incident upon it. Thus, in the ideal case, S-polarized light reflected from the prism will return to the prism S-polarized and be reflected back toward the illumination source, not into the projection lens. However, for the skew rays of the real system, the light returns to the prism with some P-polarization due to the polarization change caused by reflecting off the splitter surface. This P-polarized light will pass through the prism, into the projection lens, and onto the screen. The prism therefore introduces a polarization shift that reduces the contrast of the dark states of the projected image. However, a quarter waveplate placed between the prism and the LCD can be adjusted (by rotating it about the optical axis) so that it will compensate for the shift introduced by the prism. When the light passes through this waveplate, reflects off the LCD set to display black, and then passes back through the waveplate after reflection, the polarization of the skew rays will be rotated to the proper S-polarization state required to reflect back toward the illumination source.

A quarter waveplate is a birefringent material, i.e., the index of refraction of the material is different for light polarized along two perpendicular axes of the material. Because the light traveling through the material travels at a velocity that depends on the index of refraction, light will travel at two different speeds through this material. Light polarized along one axis of the material will travel more slowly than light polarized along the other axis. If two light distributions of the same wavelength enter the material, one polarized along the fast axis and one polarized along the slow axis, the slow axis distribution will be delayed or retarded relative to the fast axis distribution. Upon exiting the material, the two distributions will then be out of phase by an amount that depends on the thickness of the material. If the phase retardation is equivalent to one quarter of the wavelength of the light, then that retarder is called a quarter waveplate.

In typical reflective LCD systems using separate LCDs for the red, green or blue images, separate quarter waveplates are used, with the exact value of the retardation chosen to be at the dominant wavelength of the particular color band. In the system described in the background portion of this disclosure, a single LCD is used to project all three color bands. A quarter waveplate could be chosen to be approximately in the center of the whole spectrum (typically a midband green), but this would not give optical performance for the red and blue color bands. The solution set forth in the present disclosure introduces a birefringent material that could be modulated, like a liquid crystal material, so that its retardation could be changed to match the dominant wavelength of each color band. The exact voltages or drive configurations would depend on the particular liquid crystal material chosen. Finding the optimum value for each waveband would be a simple matter of trial and error adjustment for optimum performance of each individual system.

Still referring to FIG. 1, LCD device 32 typically modulates the S-polarized light to P-polarized light and then reflects the P-polarized light 38 through quarter waveplate 34 and prism 12 and to a projection lens system 40 positioned along axis 22. Projection lens system 40 may comprise a projection lens or other image projection device as known in the art. Light 38 will comprise a red, green and blue image distribution corresponding to the sequence of colorbands of light passed by color switch 28.

Figure 2:
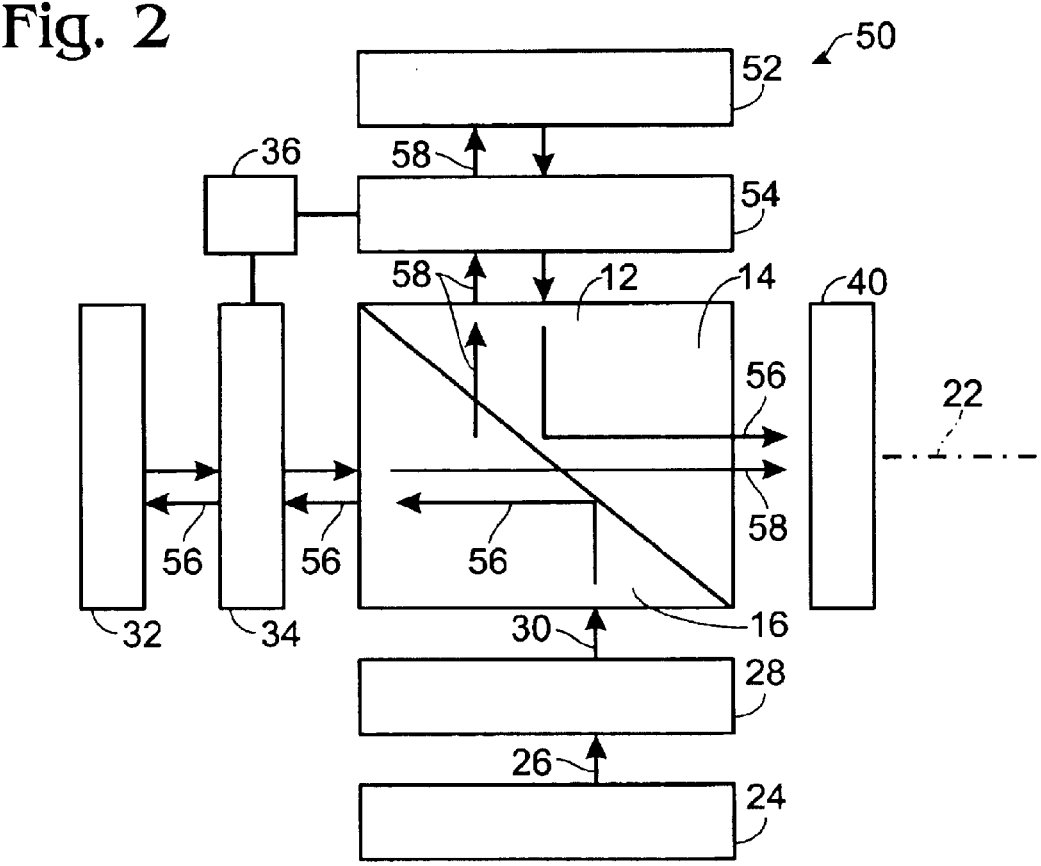
FIG. 2 is a schematic of the color field sequential projector including two electronically controllable quarter waveplates.

FIG. 2 is a schematic of a color field sequential projector including two electronically controllable quarter waveplates. In particular, projector system 50 comprises many of the same components as system 10 illustrated in FIG. 1, with the addition of a second LCD device 52, and a second electronically controllable quarter waveplate 54 positioned between prism 12 and reflection device 52. In the embodiment shown as projection system 50, color switch 28 may act to provide distinct colorbands simultaneously to each of LCD devices 32 and 52, so as to provide two distinct colorbands simultaneously to projection device 40, as described in patent application Ser. No. 10/022,768, filed Dec. 13, 2001, entitled "Two-Panel Reflective Liquid Crystal Display Projection System and Method of Using the Same," invented by James M. Florence, said patent application being incorporated by reference herein.

As an example, during operation of system 50, red light 56 is passed to LCD device 32 through quarter waveplate 34 and, simultaneously, green light 58 is passed to LCD device 52 through quarter waveplate 54. Accordingly, an appropriate voltage will be supplied to waveplate 34 by controller 36, which is operatively connected to the waveplate, such that waveplate 34 is set to be an optimum red quarter waveplate during passage of red light to and from device 32. Simultaneously, an appropriate voltage will be supplied to waveplate 54 by controller 36, which is operatively connected to the waveplate, such that waveplate 54 is set to be an optimum green quarter waveplate during passage of green light to and from device 52. In this manner, the image containing red colorband 56 and green colorband 58 that is projected on lens system 40 will be optimized for both of the red and green color components. Similarly, when green and blue light, or when red and blue light, are simultaneously supplied to reflective devices 32 and 52, quarter waveplates 34 and 54 will be optimized for the particular colorband of light applied to each of the corresponding reflective devices. The quarter waveplates may be sequenced through a variety of color optimizing settings by a change in voltage applied to the quarter waveplates by controller 36. In this manner, the dual color image projected on lens system 40 will be optimized for both of the dual color components projected at any given time. Controller 36 may also comprise a controller system including an individual controller for each of waveplates 34 and 54.

In yet another method of operation of system 50, one of the reflection devices may be set to display a single color continuously, such as red, whereas the second reflection device will sequence through green and blue colorbands such that two colors are simultaneously projected on lens system 40 at any given time. In this method of operation, the electronically controllable cell is placed in front of the green/blue sequencing reflection device to provide optimum black levels for those wavebands. A red optimized non-switching quarter waveplate, or an electronically controllable quarter waveplate which is set for red optimization, is placed in front of the red display device to optimize black for that color. In this manner, the dual color image projected on lens system 40 will be optimized for both of the dual color components projected at any given time.

Thus, a color field sequential projector including an electronically controllable quarter waveplate, and a method of operation of the same, has been disclosed. Although preferred structures and methods of operating the device have been disclosed, it should be appreciated that further variations and modifications may be made thereto without departing from the scope of the invention as defined in the appended claims.

I claim:

1. A color field sequential projector comprising:
    a light source that provides light in a first waveband region and in a second waveband region, wherein said first waveband region is distinct from said second waveband region;
    an electronically controllable quarter waveplate that receives said light from said light source, wherein said electronically controllable quarter waveplate is adapted for being electronically switched between a first state and a second state, wherein in said first state said waveplate defines a birefringent delay corresponding to one quarter of a wavelength of light in said first waveband region and in said second state said waveplate defines a birefringent delay corresponding to one quarter of a wavelength of light in said second waveband region; and
    a reflection device that receives said light from said electronically controllable quarter waveplate.

2. The projector of claim 1 wherein said a light source provides light in a third waveband region wherein said third waveband region is distinct from said first and said second waveband regions, wherein said electronically controllable quarter waveplate is adapted for being electronically switched between said first state and a third state, and wherein in said third state said waveplate defines a birefringent delay corresponding to one quarter of a wavelength of light in said third waveband region.

3. The projector of claim 2 wherein said first waveband region comprises green light, said second waveband region comprises blue light, and said third waveband region comprises red light.

4. The projector of claim 1 further comprising a second electronically controllable quarter waveplate that receives said light from said light source, wherein said second electronically controllable quarter waveplate is adapted for being electronically switched between a third state and a fourth state, and wherein in said third state said waveplate defines a birefringent delay corresponding to one quarter of a wavelength of light in a third waveband region provided by said light source and in said fourth state said waveplate defines a birefringent delay corresponding to one quarter of a wavelength of light in a fourth waveband region provided by said light source.

5. The projector of claim 1 wherein said electronically controllable quarter waveplate is electronically switched between said first state and said second state by changing a voltage applied to said quarter waveplate by a controller.

6. The projector of claim 1 wherein said reflection device comprises a liquid crystal display.

7. The projector of claim 1 further comprising a beam splitter that passes said light from said light source to said quarter waveplate.

8. The projector of claim 7 wherein said beam splitter comprises a glass prism.

9. The projector of claim 1 further comprising a projection device, wherein said projection device receives, and thereafter projects, light reflected by said reflection device in said first waveband region and in said second waveband region.

10. A color field sequential projector comprising:
    a light source that provides light in a first waveband region, a second waveband region, and a third waveband region, wherein said first, second and third waveband regions are each distinct from each other;
    a first quarter waveplate that receives light from said light source in said first and second waveband regions, wherein said first quarter waveplate is adapted for being switched between a first state and a second state, and wherein in said first state said waveplate reduces depolarization of skew rays in said first waveband region and in said second state said waveplate reduces depolarization of skew rays in said second waveband region;
    a second quarter waveplate that receives light from said light source in said third waveband region, wherein said second quarter waveplate reduces depolarization of skew rays in said third waveband region;
    a first reflection device that receives said light from said first quarter waveplate; and
    a second reflection device that receives said light from said second quarter waveplate.

11. The projector of claim 10 wherein said first, second and third waveband regions are each chosen from the waveband regions consisting of green light, blue light, and red light.

12. The projector of claim 10 wherein said second quarter waveplate is adapted for being switched between a third state and a fourth state, and wherein in said third state said waveplate reduces depolarization of skew rays in said third waveband region and in said fourth state said waveplate reduces depolarization of skew rays in a fourth waveband region provided by said light source.

13. The projector of claim 10 wherein said first quarter waveplate is electronically switched between said first state and said second state by changing a voltage applied to said first quarter waveplate by a controller.

14. The projector of claim 10 wherein said reflection device comprises a liquid crystal display.

15. The projector of claim 10 further comprising a polarized light beam splitter that passes light from said light source to said first and second quarter waveplates.

16. The projector of claim 15 wherein said beam splitter comprises first and second prisms that define an interface positioned at a forty five degree angle to an axis of light propagation through the projector.

17. The projector of claim 10 further comprising a projection device, wherein said projection device receives, and thereafter projects, light reflected by said first and second reflection devices in said first, second and third waveband regions.

18. A method of providing a multicolor image, comprising the steps of:
    sequentially providing light in a first waveband region and light in a second waveband region, wherein said first waveband region is distinct from said second waveband region;
    providing an electronically controllable quarter waveplate that sequentially receives said light in said first and second waveband regions;
    electronically switching said quarter waveplate between a first state and a second state, such that said quarter waveplate is in said first state when said quarter waveplate receives said light in said first waveband region and such that said quarter waveplate is in said second state when said quarter waveplate receives said light in said second waveband region, wherein in said first state said waveplate defines a phase retardation that increases a color purity of said first waveband region and in said second state said waveplate defines a phase retardation that increases a color purity of said second waveband region; and providing a reflection device that sequentially receives said light in said first and second waveband regions from said electronically controllable quarter waveplate; and providing a projection device that sequentially receives and thereafter sequentially projects said light in said first and second waveband regions reflected from said reflection device.

19. The method of claim 18 wherein said step of electronically switching said quarter waveplate between said first state and said second state comprises applying a first voltage to said quarter waveplate to place said quarter waveplate in said first state and applying a second voltage to said quarter waveplate to place said quarter waveplate in said second state, wherein said first voltage is distinct from said second voltage.

20. The method of claim 18 further comprising electronically switching said quarter waveplate between said first state and a third state, such that said quarter waveplate is in said first state when said quarter waveplate receives said light in said first waveband region and such that said quarter waveplate is in said third state when said quarter waveplate receives light in a third waveband region, wherein in said first state said waveplate defines a phase retardation that increases a color purity of said first waveband region and in said third state said waveplate defines a phase retardation that increases a color purity of said third waveband region.

* * * * *